United States Patent

Manz

[11] 3,940,644
[45] Feb. 24, 1976

[54] PLURAL BRUSH DC MACHINE AND COMMUTATOR ASSEMBLY

[75] Inventor: August Frederick Manz, Union, N.J.

[73] Assignee: Union Carbide Corporation, New York, N.Y.

[22] Filed: Oct. 15, 1974

[21] Appl. No.: 514,733

[52] U.S. Cl............................... 310/148; 310/136
[51] Int. Cl.² ...................................... H02K 13/00
[58] Field of Search............ 310/136, 137, 220–225, 310/233, 236, 219, 138, 139, 127

[56] References Cited
UNITED STATES PATENTS

| 439,459 | 10/1890 | Zipernowsky et al........ 310/136 X |
| 1,461,446 | 7/1923 | LeBlanc............................. 310/219 |
| 1,959,462 | 5/1934 | Salda ............................. 310/220 X |
| 3,453,513 | 7/1969 | Bates et al. ..................... 310/220 X |
| 3,662,201 | 5/1972 | Madsen............................. 310/220 |

FOREIGN PATENTS OR APPLICATIONS

| 933,041 | 9/1955 | Germany ........................... 310/136 |

*Primary Examiner*—Donovan F. Duggan
*Attorney, Agent, or Firm*—Eugene Lieberstein

[57] ABSTRACT

In a direct current machine having plural brushes arranged for sliding engagement over the surface of the commutator assembly along separate paths; wherein the commutator assembly comprises a multiple number of commutator bars with each bar having a current transfer surface divided into conducting and nonconducting sections, each section being located in one of the separate paths, and with the sections of adjacent commutator bars so arranged to provide a checkerboard pattern of conducting and nonconducting sections over the commutator assembly surface. The brushes are interconnected to the machine load through a predetermined circuit network which controls the short circuit current.

7 Claims, 6 Drawing Figures

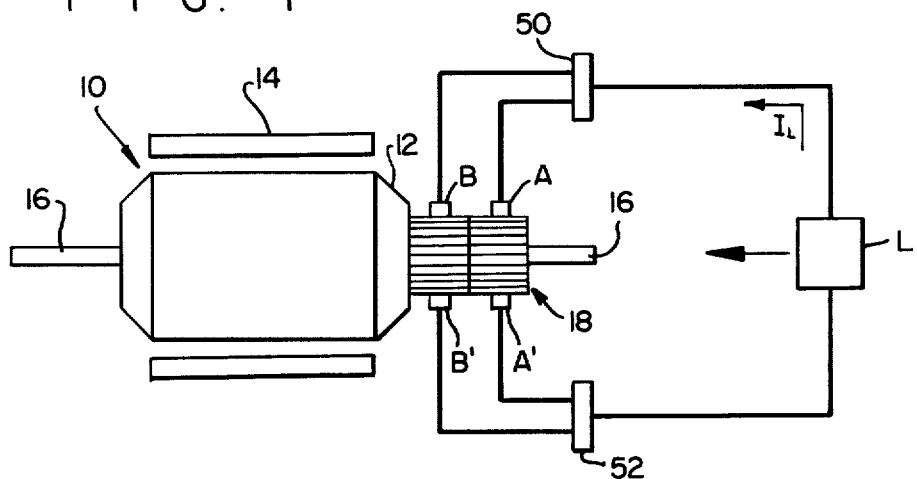
FIG. 1
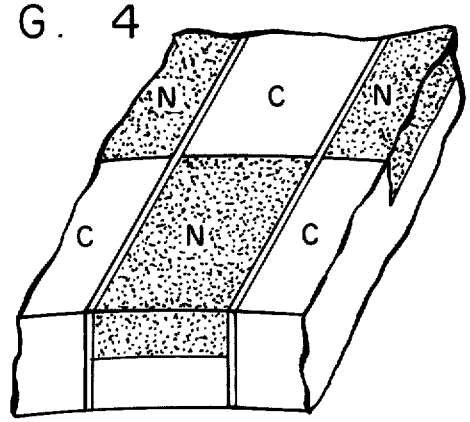
FIG. 4
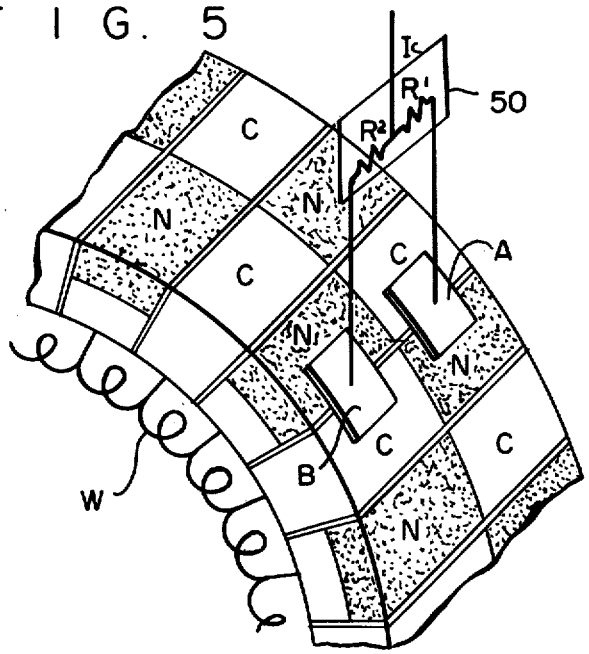
FIG. 5
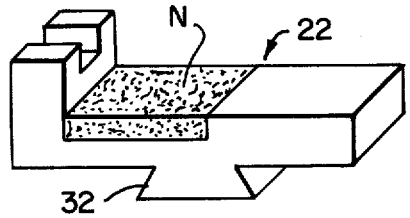
FIG. 2A
FIG. 2B
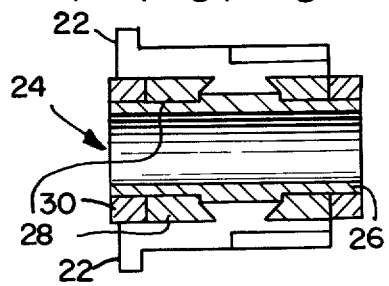
FIG. 3

PLURAL BRUSH DC MACHINE AND COMMUTATOR ASSEMBLY

FIELD OF THE INVENTION

This invention relates to DC machines operated from either an AC or DC supply and more particularly to an improved commutator assembly for a DC (direct current) machine employing plural sets of brushes. The expression DC machine is intended for purposes of the present invention to include universal motors and commutator motors which can be operated from either an AC or DC supply.

DESCRIPTION OF THE PRIOR ART

The process of commutation in a DC machine relates to the mechanism for transferring the emf's induced in the coils of the armature winding through the brush contact at the commutator surface to an external load. The design of the commutator assembly and brushes primarily determines the useful life, reliability and output performance for the machine. Poor commutation results from faulty mechanical or electrical conditions. Some of the basic mechanical factors which will give rise to poor commutation include the following: high mica, rough or eccentric commutator, vibration, chattering and insufficient brush spring pressure. The electrical conditions are all attributable to sparking and heating of the brushes and commutator.

During the process of commutation, when one brush bears on two commutator bars at the same time, a short circuit current is established in a path formed by the brush, the two commutator bars bridged by the brush and the armature conductors, hereinafter simply referred to as the armature coil, coupling the two commutator bars. This current must be controlled to avoid excessive heating and destructive sparking. Sparking causes destructive blackening, pitting and wear of both commutator and brushes, conditions which are regenerative causing in turn some of the mechanical problems mentioned above and leading to burning away of the copper commutating bars and carbon brushes.

Corrective action to remedy the electrical conditions resulting in poor commutation involve introducing an opposing emf into the short-circuited path to neutralize the self-induced emf or by introducing fixed resistance into the circuit. The former is accomplished by means of interpoles which is the most widely practiced method today for larger machines. Present day smaller machines provide corrective action, if at all, by special brush design, high resistance leads, longer and complex winding paths etc.

In the earlier part of this century many techniques were advanced for controlling the short circuit current in a DC machine by introducing fixed resistances into the short-circuited commutating path. Such techniques have in common the use of a structural arrangement involving either high resistance leads, more than one commutator or the use of more than one armature winding. The latter concepts involving dual commutators or plural armature windings are impractical and actually so complicate the design of the machine from a manufacturing standpoint that the mechanical conditions leading to poor commutation are accentuated. As a result, the use of added resistance to control short circuit current has been relegated to smaller DC machines.

SUMMARY OF THE INVENTION

The DC machine of the present invention includes a commutator assembly having a multiplicity of commutator bars, with each commutator bar having a current transfer surface, hereinafter defined as the surface which engages the commutating brushes, divided into alternating conducting and non-conducting sections. The current transfer surface of each bar is alternately arranged relative to the current transfer surface of adjacent bars to produce a checkerboard pattern over the commutating surface of the DC machine. At least two commutating brush sets, each consisting of a positive and negative brush, are arranged for sliding engagement against the current transfer surface of each commutator bar and along separate paths each including a section of each commutator bar. The brush sets are aligned relative to one another so that when one brush set is contacting conducting sections the other set is contacting nonconducting sections. The positive and negative brush of each set is intercoupled to the positive and negative brush of the other set respectively, through an electrical circuit network which is external of the structural assembly of the commutator. With such an arrangement each coil undergoing commutation completes a short-circuited path through the external circuit network. Since the circuit netword is not a part of the construction of the commutator it can be readily modified to suit the application at hand.

Advantages of a commutator assembly constructed with the aforegoing checkerboard current transfer surface configuration for use in a DC machine include the following: there are no limitations on the size or capacity of the machine; permits conventional drum wound armature coil construction; permits adjustable control over the short circuit current through adjustment in the external circuit network; there are substantially less restrictions on brush design; the volumetric efficiency is not changed; and the otherwise critical need for interpoles in larger DC machines is minimized.

Accordingly, it is the principle object of the present invention to provide a DC machine having an improved commutator assembly for use with multiple brushes.

Other objects and advantages of the present invention will become apparent from the detailed description of the invention when taken in connection with the accompanying drawings of which:

FIG. 1 is a schematic diagram partially in perspective illustrating the DC machine of the present invention;

FIG. 2a and 2b are illustrations of two adjacent commutator bars of the commutator assembly of FIG. 1;

FIG. 3 illustrates a construction for the commutator assembly of FIG. 1 which facilitates assembling the commutator bars of FIG. 2 to provide the checkerboard current transfer surface arrangement in accordance with the invention;

FIG. 4 is an exploded perspective view of part of the surface of the commutator assembly of FIG. 1; and FIG. 5 is a perspective view similar to FIG. 4 with two of the commutating brushes and the armature winding diagrammatically represented to show the electrical connections.

DETAILED DESCRIPTION OF THE INVENTION

Referring now to the drawings and in particular to FIG. 1 in which a DC machine 10 is shown including an armature 12, a field structure 14, shaft 16, a commutator assembly 18 and two commutator brush sets A, A' and B, B' respectively. Each brush set consists of a positive and negative brush with the negative brush of each set given the primed designation merely for convenience. The DC machine 10 can represent either a generator or a motor. When the DC machine 10 is functioning as a motor it can be operated from either a constant impressed emf or an alternating emf.

The field structure 14 and armature 12 are of conventional design and manufacture with the armature 12 consisting of an armature winding W wound about a core of iron laminations mounted on the shaft 16 for rotation within the field structure 14. The direct current armature winding W is conventionally wound (not shown) with copper conductor coils formed automatically on a machine and laid in slots around the armature core with the appropriate number of turns for each slot encased within a common shield which constrains the turns and provides insulation. The ends of the coils of the armature winding 20 are left bare in a manner well known in the art for connection to the commutator assembly 18.

A typical commutator assembly 18 of the present invention consists of a multiplicity of commutator bars 22, two of which are illustrated in FIGS. 2a and 2b, arranged about a rotatable support structure 24, as shown in FIG. 3, to provide the checkerboard commutating surface configuration as will be explained in detail hereafter. Typically the rotatable support structure 24 includes a sleeve member 26 which is mounted on the shaft 16 of the machine 10 for common rotation with the armature 12. The commutator bars 22 are assembled around the sleeve member 26 to form a geometric cylinder and are fixed in this position by the use of rings 28 which are wedged against the commutator bars 22 and clamped together by clamps or bolts 30. The underside 32 of each commutator bar 22 has a dovetail configuration which interlocks with the rings 28 of the support structure 24 to facilitate its assembly and disassembly within the support structure 24. A thin film of mica or other insulator is applied to the commutator bars 22 to electrically isolate each bar 22 from one another as well as from the support structure 24. It should be understood that the construction of the support structure 24 does not form part of the present invention and that many alternative support means may be used to assemble commutator bars 22. After assembly the exposed commutating surfaces can be machined to provide a smooth current transfer surface with the required degree of surface finish.

Each of the commutator bars 22 may have an extended neck 34 with a slot 36 into which the coil ends of the armature winding W are soldered and with the number and slot location for the coil connections being dependent upon the armature winding configuration as is well known in the art. The current transfer surface of each of the commutating bars 22 is defined as the surface upon which the commutating brushes ride during rotation of shaft 16 and is divided into a predetermined number of conducting and nonconducting surface sections labeled C and N respectively. For simplicity each commutator bar 22 is shown in FIGS. 4 and 5 divided into only two surface sections, one conducting and the other nonconducting. The commutator bars 22 are arranged so that the surface sections C and N of adjacent bars 22 alternate so as to form a checkerboard pattern. The term "section" is intended for purposes of the present disclosure to embrace a predetermined surface area, preferably of a substantially rectangular or square geometry although the shape itself is not critical. The depth of any nonconducting section N is not material to the invention provided it does not extend through the full cross-section of the commutating bar 22. Thus, each conducting and nonconducting section C and N could be prepared as a relatively thin covering using conventional masking techniques or, as is preferable, by fabricating each commutator bar 22 as a composite body of a solid conducting material, such as copper, having at least one slotted compartment which is filled with a nonconducting section N. The nonconducting sections N may be formed using any nonconducting material. Any conventional technique could be used to insert and rigidly contain the nonconducting sections N within the slotted spaced provided in the commutator bars 22 such as, by means of interlocking tongue and groove fittings etc. It is important to note that the slotted spaces must alternate as illustrated in FIGS. 2a and 2b so that the required checkerboard commutating pattern is formed by the appropriate arrangement of commutator bars 22 about the support structure 24. Completion of the commutator assembly 18 would include, as explained earlier, the application of an insulator to insulate each commutator bar 22 from one another and possibly a surface finishing operation to provide a more appropriate current transfer surface. For this reason, the material of construction for the nonconducting sections N must be carefully selected so as to exhibit compatible wear characteristics with the conducting sections C.

The current transfer surface area of each conducting section C is preferably equal to the surface area of each nonconducting section N. As such, when each commutating bar 22 is divided into two sections C and N respectively, the checkerboard surface pattern results in two equal but out of phase commutating paths of travel. The brush sets AA' and BB' are arranged for relative engagement along said commutating paths of travel and are preferably indexed so that when one brush set lies on nonconducting sections the other engages conducting sections as illustrated in FIG. 5.

The operation of the DC machine 10 having the checkerboard commutating surface configuration as explained heretofore will now be described.

As shown in FIG. 1, the positive brush A and B of each brush set is coupled together through the electrical network 50 to one side of the load L whereas the negative brush A' and B' of each brush set is coupled together to the opposite side of the load L through the electrical circuit network 52. Although circuit network 50 may be different from circuit network 52 it will for simplicity be assumed that they are identical and are purely resistive. It is also preferred that brush set AA' is mechanically aligned relative to brush set BB' so that the positive brushes and the negative brushes occupy the same position relative to one another on any given commutator bar. Thus, at any given instant of time any one of the following three operating conditions are possible: (1) brush set AA' engages only conducting sections C while brush set BB' is engaging only nonconducting sections N; (2) brush set AA' engages only nonconducting sections N while brush set BB' is engaging only conducting sections C; and (3) both brush sets AA' and BB' bridge a conducting section C and a nonconducting section N respectively. FIG. 5 illustrates the connection of the positive brushes A and B during the third operating condition. Circuit network 50 which is identical to circuit network 52 is shown composed of but two resistors R1 and R2.

During the first operating condition, the full load current $I_L$ will flow through resistor R1 of circuit network 50, brush A, the conducting section C upon which brush A lies, the armature winding W from whence the load current will pass through to the negative brush A', its counterpart resistor (not shown) in circuit network 52 and back to the load L.

During the second operating condition the full load current $I_L$ will pass through brush set BB', and none through brush set AA', in the same fashion as explained above with respect to the first condition but through resistor R2 of circuit network 50 and its counterpart resistor R2 (not shown) in circuit network 52.

It is only during the third operating condition that the load current is distributed through both sets of brushes AA' and BB' respectively. When R1 equals R2 the distribution of load current is equal through both brush sets.

In the conventional DC machine when a brush bridges two commutating bars a short circuit current flows through the brush, the two bars that are bridged by the brush and the coil connecting the two bars. With the commutating arrangement shown in FIG. 5 a short circuit can develop only between the two brushes A and B as well as between the corresponding negative brushes A' B'. The completed short circuit path would be formed from positive brush A, the conducting section C upon which it lies, through the armature coil W connecting that commutating bar to the adjacent commutating bar bridged by the brushes A and B, and then to brush B through the conducting section C upon which it lies; burshes A and B being electrically connected together through the resistors R1 and R2. If resistors R1 and R2 are reduced to zero the circuitous current path established to form the short circuit would be equivalent to the conventional case where brushes A and B are one and the nonconducting sections N would be useless.

Thus resistors R1 and R2 provide complete control over the short circuit current. Again, it is emphasized that the invention is not limited to the case of equal resistors or in fact to purely resistive elements. When active circuit elements are employed in place of resistors R1 and R2 for circuit network 50 and 52 opposing emf's can be developed to produce the same end result as is now accomplished by means of interpoles.

What is claimed is:

1. In a direct current machine comprising: a field structure; an armature adapted for rotation within said field structure and having an armature winding consisting of a plurality of armature coils; a single commutator mounted for rotation with said armature and divided into a multiple number of commutator bars each insulated from one another; said armature coils being electrically coupled to said commutator bars; and at least two commutating brush sets arranged for relative sliding engagement against the current transfer surface of each commutator bar along separate paths respectively, the improvement comprising: wherein the current transfer surface of each commutator bar includes at least one conducting section and one nonconducting section respectively with each section lying in a separate path and with the abutting sections of adjacent commutator bars arranged so as to form a checkerboard pattern of conducting and nonconducting sections along the separate paths traversed by each brush set; and circuit means for electrically coupling said brush sets to one another.

2. In a direct current machine as defined in claim 1 wherein each brush set includes a positive and negative brush and wherein said circuit means includes a first circuit network for electrically coupling the positive brushes of the brush sets together and a second circuit network for electrically coupling the negative brushes of the brush sets together.

3. In a direct current machine as defined in claim 2 wherein said first circuit network comprises first and second resistor means adapted therebetween for connection to a load and wherein said second circuit network comprises first and second resistor means adapted therebetween for connection to the Load.

4. In a direct current machine as defined in claim 3 wherein said first and second resistor means of said first circuit network is equal to one another and to the corresponding first and second resistor means of said second circuit network.

5. In a direct current machine as defined in claim 3 wherein said brush sets are arranged to travel along said separate paths in unison such that when one set engages said conductive sections the other set engages said nonconductive sections and vice versa.

6. In a direct current machine as defined in claim 2 wherein each commutator bar is a composite structure containing a conductive body having at least one predetermined surface geometry representative of said conductive section and at least one detachable nonconductive section having a predetermined surface geometry substantially identical to the surface geometry of said conductive section.

7. In a direct current machine as defined in claim 6 wherein each commutator bar of said commutator is arranged to form a geometric cylinder with its longitudinal axis concentric with the longitudinal axis of the armature and wherein each nonconductive section of each commutator bar is alternately disposed with respect to the nonconductive sections of adjacent bars.

* * * * *